United States Patent [19]
Luckow

[11] Patent Number: 5,746,315
[45] Date of Patent: May 5, 1998

[54] HOLDING DEVICE FOR COMPACT DISCS

[76] Inventor: Hans-Jürgen Luckow, Rhener Kehre 10, D-24558 Henstedt-Rhen, Germany

[21] Appl. No.: 593,152

[22] Filed: Feb. 1, 1996

[30] Foreign Application Priority Data

Feb. 2, 1995 [DE] Germany .................. 195 03 264.0

[51] Int. Cl.$^6$ .................................................. B65D 85/57
[52] U.S. Cl. ...................... 206/310; 206/308.1; 206/493
[58] Field of Search ........................... 206/308.1, 309, 206/310, 311, 312, 313, 493, 307

[56] References Cited

U.S. PATENT DOCUMENTS

| | | | |
|---|---|---|---|
| 4,793,479 | 12/1988 | Otsuka et al. . | |
| 4,874,085 | 10/1989 | Groberker et al. | 206/310 |
| 5,244,085 | 9/1993 | Lammerant et al. . | |
| 5,251,750 | 10/1993 | Gelardi et al. . | |
| 5,269,409 | 12/1993 | Brandt et al. | 206/310 |
| 5,284,248 | 2/1994 | Dunker | 206/310 |
| 5,322,162 | 6/1994 | Melk | 206/310 |
| 5,377,825 | 1/1995 | Sykes et al. | 206/313 |
| 5,450,951 | 9/1995 | Luckow | 206/308.1 |
| 5,558,220 | 9/1996 | Gartz | 206/310 |

Primary Examiner—Paul T. Sewell
Assistant Examiner—Luan K. Bui
Attorney, Agent, or Firm—Harness, Dickey & Pierce, P.L.C.

[57] ABSTRACT

The holding device has the purpose of holding compact discs in position within a receiving container. The receiving container includes at least one upper shell and at least one lower shell. The holding device is equipped with clamping elements for retaining the compact discs in the area of a central opening. The clamping elements are extended, essentially vertically, to a support surface for the compact discs. Beyond this, the clamping elements are disposed along a circumference of a central opening of the support surface. Originating from a center of the holding device, a central opening is disposed in a radial direction behind at least one of the clamping elements. The opening extends in a circumferential direction along at least a portion of a rearward boundary of the clamping element. The clamping element contains at least one positioning projection, which forms a collar over at least a portion of the opening.

20 Claims, 9 Drawing Sheets

HOLDING DEVICE FOR COMPACT DISCS

BACKGROUND AND SUMMARY OF THE INVENTION

The invention concerns a holding device for compact discs within a receiving container, which contains at least one upper shell and at least one lower shell and which is equipped with clamping elements for retaining the compact discs in the area of a central opening, and where the clamping elements with their vertical ridges rise in an essentially perpendicular direction to a support surface of a plate of a holding device for the compact discs and are disposed along the circumference of a central opening of the receiving surface and where, proceeding in a radial direction from a center of the holding device, an opening is disposed behind at least one of the clamping elements, which opening extends in a circumferential direction along at least a part of a rearward boundary of the clamping element.

Such holding devices for compact discs are available in many different embodiments. Receiving containers with such holding devices are known, which, depending on the kind of application, can be equipped for retaining one, two or three compact discs. The retention of the compact discs is accomplished, in the case of most of the holding devices, in the area of a central opening of the compact discs. But it is also known to utilize lateral clamping in the region of a rim of the compact discs. In those cases, where the compact disc is retained in the area of the central opening, clamping elements are employed, which are disposed along the circumference of the central opening of the support surface, and which are diverted elastically in the direction of a center of the central opening when the compact disc is pushed upon them and which subsequently reposition themselves elastically for retaining the compact disc.

The holding devices for the compact discs are, as a rule, made of plastic by means of an injection molding process. In order to facilitate a relatively simple and thus cost-effective design of the molds for the products made by injection molding, undercuts must be avoided. The result of this is that the clamping of the compact disc in the area of the holding devices is basically effected by means of radial forces. From this, certain disadvantages result, especially in the case of a prolonged use of the holding device, because in the case of frequent use, material fatigue occurs and the spring-like elasticity of the material of the holding devices diminishes. As the time of their use increases, the force with which the compact discs are clamped into position, therefore, becomes progressively weaker.

In the publication U.S. 5,244,085, a holding device for compact discs is already described, in which clamping elements are disposed along a central opening of a plate of a holding device for holding the compact discs in place. The clamping elements consist of vertical ridges as well as of support elements. Behind the clamping elements, openings are provided, which are disposed in such a manner that they are facing in a direction away from the central opening. The plate of the holding device includes an outer reinforcement ring, which is connected with an interior carrier ring by means of ridges in the clamping device. Originating from an interior support ring, the support bodies of the clamping elements extend in a direction facing away from a center. In this way, the support ridges are extended at a distance past the vertical elements.

In the publication U.S. 5,251,750, clamping elements for holding compact discs in place in the region of a carrier plate are described, which clamping elements are connected pivotally with a central part by means of joints. The clamping elements likewise are extended into openings after originating from an interior support ring. The clamping elements are surrounded by an outer reinforcing ring of the support plate.

From the publication U.S. 4,743,479 a holding device for compact discs is known, in which once again support ridges are provided, which, originating from the plate of the holding device for limiting the openings, extend in such a manner that they bypass the clamping elements and terminate in the area of a central part, which carries the clamping elements.

It is the objective of the present invention to construct a holding device of the kind mentioned in the introduction in such a manner that an improved possibility for holding the compact discs in place is being provided.

This objective is achieved according to the invention in that the clamping element includes at least one positioning projection which protrudes at least in some regions beyond the opening, in that the plate for the holding device extends laterally into a region disposed adjacent to the vertical ridges, and in that by means of the lateral disposition of the plate of the holding device with respect to the vertical ridges a transition of the vertical ridges into the plate of the holding device is formed.

By virtue of the disposition of the openings behind the clamping elements, it is possible when carrying out an injection molding process for producing the holding device, to allow molded parts to protrude through the openings and to provide a separating plane between the two halves of the mold, which is offset from a plane of reference generated by the central opening. In this manner, the positioning projection, which, in some regions, protrudes beyond the opening, can be generated, which contributes toward a better positioning of the compact disc. In this way, the compact disc is not merely clamped in place, but a mechanical locking action takes place. The dimensioning of the positioning projection is carried out as a function of the separating forces, which can be determined in advance and which may be required in order to achieve a separation of the compact disc from the holding device. There is a very wide range of design possibilities which can be utilized as a function of the various application requirements.

A mechanical locking action of a compact disc, which is held in a fixed position, can be facilitated by guiding the positioning projection, which has the shape of a shoulder, into a vertical ridge of the clamping element.

In order to facilitate a removal of a compact disc, which had been held in a fixed position, it is also possible that the positioning projection, after it is rounded off, may be guided into a vertical ridge of the clamping element.

In a further embodiment, the positioning projection is guided into the vertical ridge of the clamping element from a ramp, and the ramp includes a boundary plane which extends essentially obliquely relative to the vertical ridge.

Centering the compact disc prior to holding it in place is being facilitated in that at least one of the clamping elements contains a radial ridge which extends from the vertical ridge in the direction of the center of the holding device.

For a holding device for two compact discs, it is advantageous if the radial ridges along the circumference of the central opening are alternately disposed in a region where the ends of the vertical ridges are facing away from each other.

In order to hold a single compact disc in place, it is sufficient that the vertical ridges, as they originate from a plate of the holding device, rise at one side above one of the support surfaces of the plate of the holding device.

In order to hold two compact discs in place in the region of the boundary planes of a plate of a holding device, where the boundary planes are facing away from each other, it has been found to be advantageous if the vertical ridges are elevated in directions facing away from each other above both of the support planes which form the boundaries of the plate of the holding device.

A positioning projection of a relatively large circumferential extension can be formed in such a manner that the opening in the direction of the circumference extends across the entire width of the clamping element.

Placing the compact disc upon the clamping elements can be assisted by having the opening and the positioning projection extend in the circumferential direction over a partial region of the clamping element and by having them essentially symmetrically disposed with regard to a center line of the clamping element.

An increased elasticity during the placement of a compact disc can be generated by providing at least two openings for at least one clamping element, which openings are separated from each other by a connecting ridge.

A further degree of freedom in the design consists in the fact that the openings are disposed non-symmetrically with respect to the center line.

In order to achieve a favorable distribution of forces within the material it is proposed that the opening be tapered in the direction facing away from the clamping element.

BRIEF DESCRIPTION OF THE DRAWINGS

In the drawing, embodiments of the invention are shown schematically. The following is shown.

DESCRIPTION OF THE PREFERRED EMBODIMENTS

Figure 1:
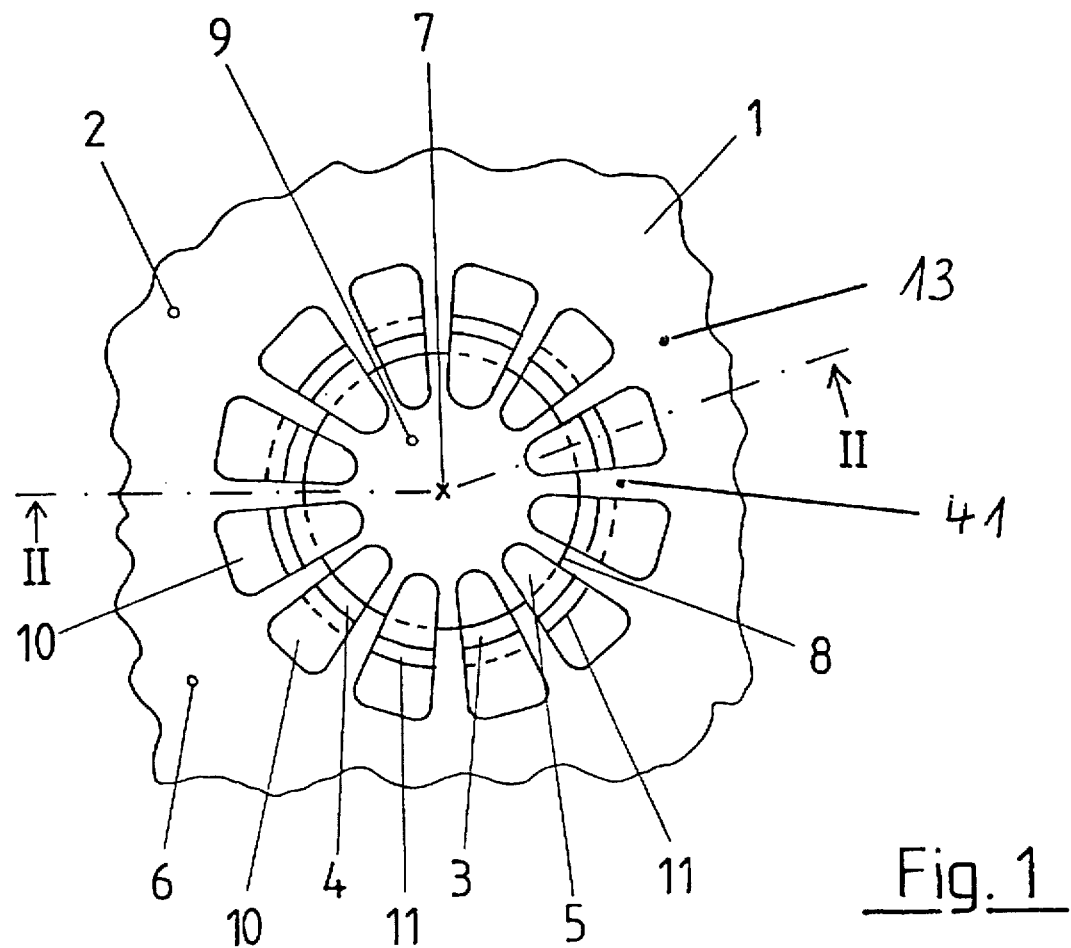
FIG. 1 a top view of a partial presentation of a holding device with clamping elements, which are made in the shape of a hook and which are disposed in alternating orientations, FIG. 2 a cross-section in accordance with section line II—II in FIG. 1, FIG. 3 an enlarged presentation of detail III in FIG. II, FIG. 4 a presentation of a section which is displaced relative to FIG. III in such a manner that the hook-shaped clamping element is shown in a side view, FIG. 5 a view of the clamping element as seen from the direction V in FIG. 4, FIG. 6 a top view of a clamping element in which the design of the opening has been changed with regard to FIG. 1, FIG. 7 an embodiment with two openings for each clamping element, FIG. 8 an embodiment with an opening which is disposed non-symmetrically with regard to a center line of the clamping element, FIG. 9 a side view of a clamping element with a rounded positioning projection, FIG. 10 a further variation of the clamping element, FIG. 11 a top view of a holding device which is made in the form of a tray, FIG. 12 a vertical section through a holding device which is capable of being placed in a receiving container after it has been disassembled into an upper shell, a lower shell and a tray, FIG. 13 a presentation of the principle of alternately disposed vertical ridges for the formation of the clamping elements for a holding device for two compact discs in the region where the sides of a tray are facing away from each other, FIG. 14 a presentation, modified from that of FIG. 13, with different lengths of the vertical ridges, FIG. 15 a further modified presentation including the use of hook-shaped clamping elements of alternating orientations, FIG. 16 a further variation of the design of the clamping elements for holding two compact discs in place and FIG. 17 a further variation involving the use of alternately disposed hook-shaped clamping elements.

In accordance with FIG. 1, a holding device (1) for compact discs has been designed as a tray (2) which has been provided with clamping elements (3). In accordance with the embodiment of FIG. 1, the clamping elements (3) consist of vertical ridges (4) as well as radial ridges (5). The vertical ridges (4) rise in an essentially vertical direction above a plane generated by a support surface (6) of the tray (2). The radial ridges (5) extend radially, originating from the ends of the vertical ridges (4), and in the direction of the center of the holding device (7). The clamping elements (3) are disposed along a circumference (8) of a central opening (9) of the support surface (6).

Originating from the center of the holding device (7), there are openings (10) disposed behind the clamping elements (3), which openings constitute break-outs in the support surface (6).

In the design of the holding device (1) for holding a single compact disc in place, it is sufficient if the vertical ridges (4) are elevated only in the region of one of the surfaces of the tray (2). However, if it is contemplated to hold compact discs in place in the region of both supports surfaces (6) of the tray (2), then provisions can be made in accordance with the presentation of FIG. 2 to see to it that the vertical ridges (4) are elevated above both support surfaces (6).

In order to ensure that the parts can be adequately ejected from the mold if they are produced by an injection molding process, the radial ridges (5) are alternately disposed in the region of the ends of the vertical ridges (4) which are facing away from each other. Thus, the end portions of the vertical ridges (4) are disposed along the circumference (8) in the region of the support surfaces (6), which end portions are alternately formed with a radial ridge (5) and without a radial ridge (5). The regions of the vertical ridges (4) which are facing away from the radial ridges (5) can likewise be used for clamping compact discs in place. But in principle, it is also conceivable to hold them in place only in the region of those ends of the vertical ridges (4), which are provided with the radial ridges (5).

The vertical ridges (4) have been provided with positioning projections (11) in the region of one of their ends. According to one of the embodiments in FIG. 2, the positioning projections (11) are always disposed as elongations of the radial ridges in such a way that the positioning projections (11) protrude beyond the openings (10) such that the positioning projections (11) form a collar overlying openings (10). By this means, a positioning mechanism for holding the compact disc in place is being provided.

Figure 3:
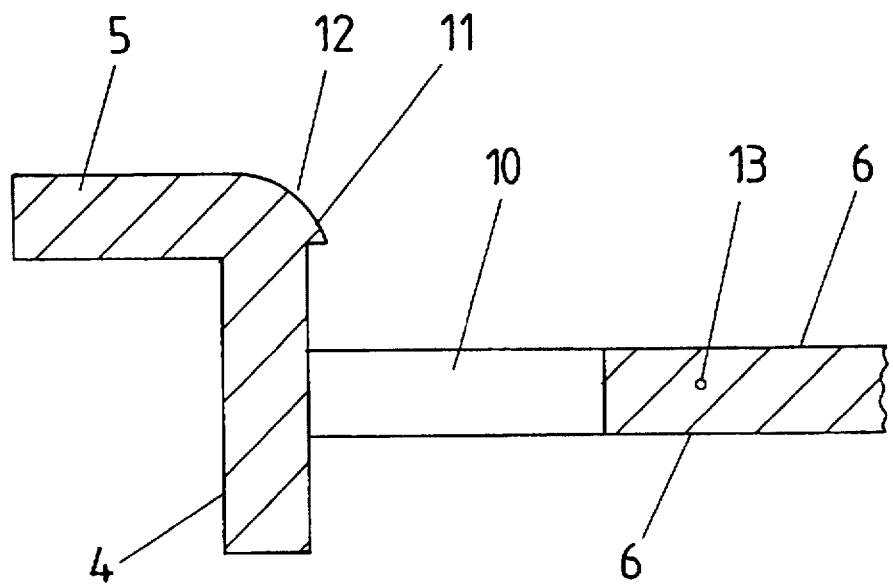

From the enlarged presentation in FIG. 3, it can be recognized that, according to one embodiment of the positioning projection (11) it is contemplated to provide a shoulder or step-like transition zone from the positioning projection (11) into the region of the vertical ridge (4). In the region of the transition from the positioning projection (11) to the radial ridge (5), a rounded continuous transition zone (12) is contemplated. This makes it easier to achieve the required centering of a compact disc, which needs to be held in place when it is put in its position.

Figure 4:
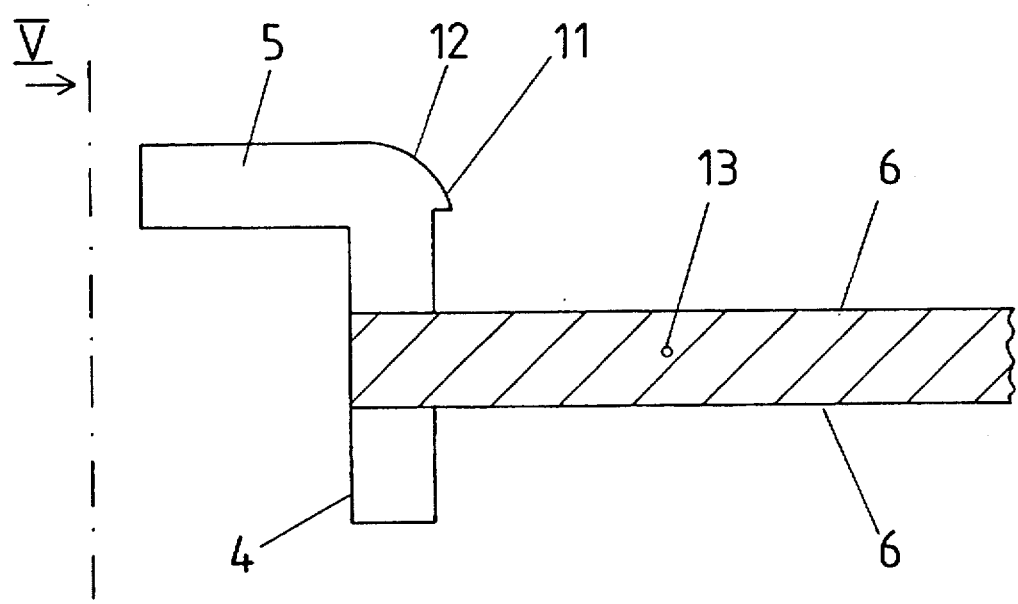

FIG. 4 shows, in a section which has been displaced relative to the presentation in FIG. 3, that a plate (13) of a holding device of the tray (2), which is bounded by the support surfaces (6), extends all the way into a region adjacent to the sides of the vertical ridges (4). In this way, a sufficient stability is ensured in the area of a transition of the vertical ridges (4) to the plate of the holding device (13).

Figure 5:
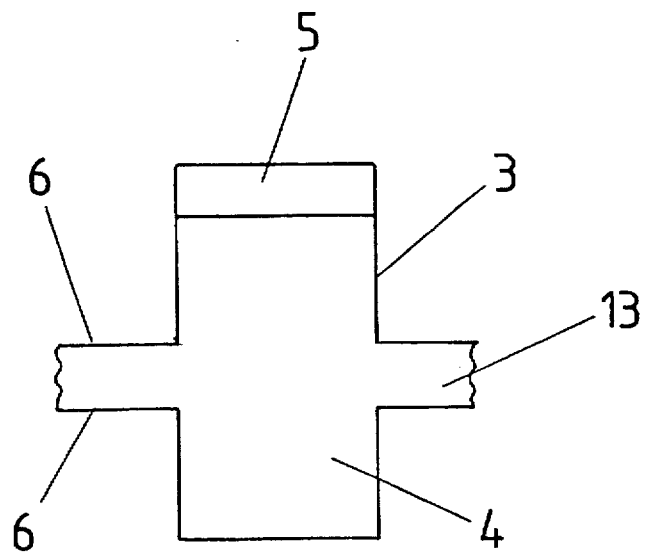

FIG. 5 shows the clamping element (3) in accordance with FIG. 4 as viewed from the direction V in FIG. 4. From this presentation as well, the transition of the clamping element (3) into the plate of the holding device (13) can be seen.

Figure 6:
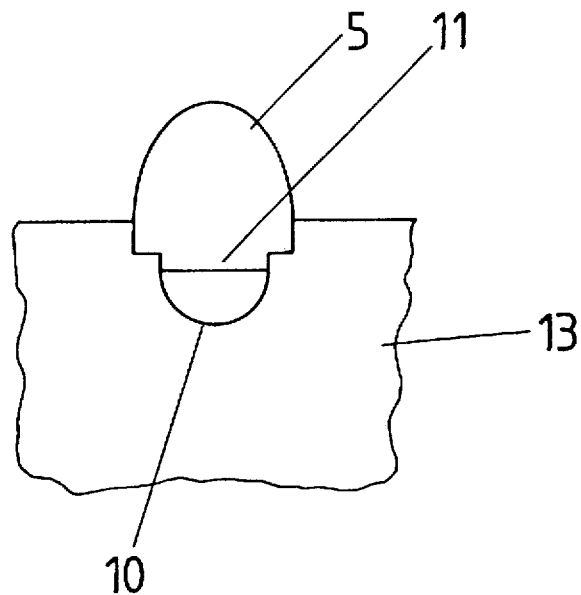

From the top view of the clamping element (3) in FIG. 6, it can be seen that, as compared to the presentation of FIG. 1, modified configurations for the openings (10) are possible.

According to FIG. 6, a smaller opening (10) as compared to FIG. 4 (1) is contemplated. In the radial direction, the opening (10) in a particular embodiment is sufficiently large, in principle, if it ensures that the positioning projection (11) can be formed. In the direction of the circumference, it is contemplated according to FIG. 6 that the opening (10) extend only over a part of the extension of the clamping element (3). In this case, the opening (10) is disposed relative to the clamping element (3) in such a manner, that in a rear view of the vertical ridge (4), a region of the vertical ridge (4), which is free from positioning projections, is always provided adjacent to the positioning projection (11).

Figure 7:
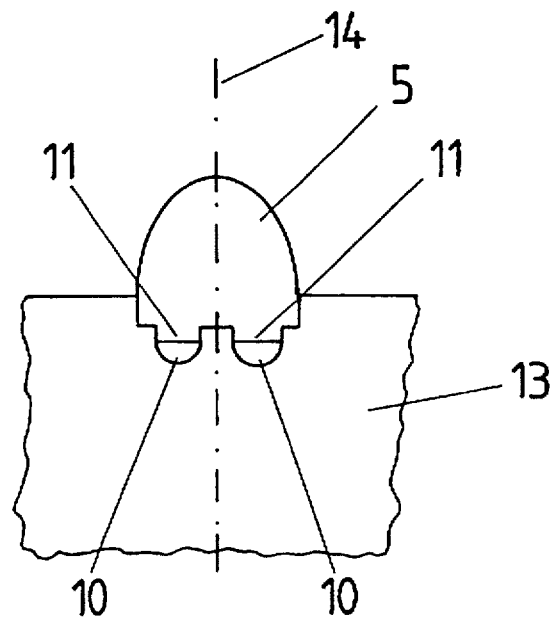
Figure 8:
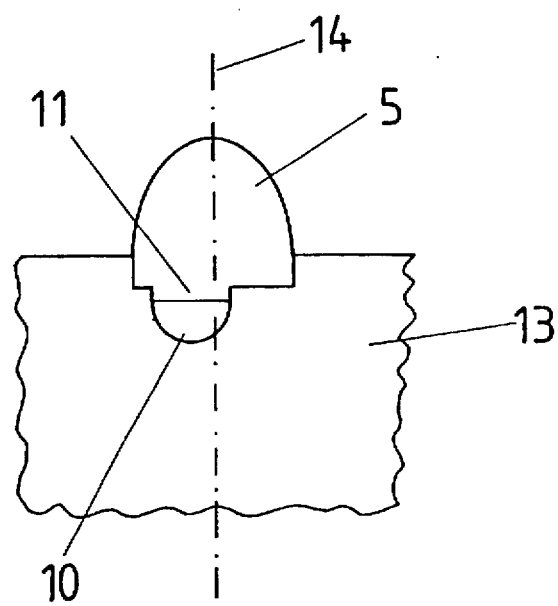

In accordance with FIG. 7, the clamping element (3) has been provided with two openings (10), which have been disposed at a distance from and symmetrically with regard to a center line of the clamping element (3). In this way, the two positioning projections (11) are formed in the region of the clamping elements (3). [p ]FIG. 8 shows a disposition of the opening (10), which is nonsymmetrical with respect to the center line (14).

Figure 9:
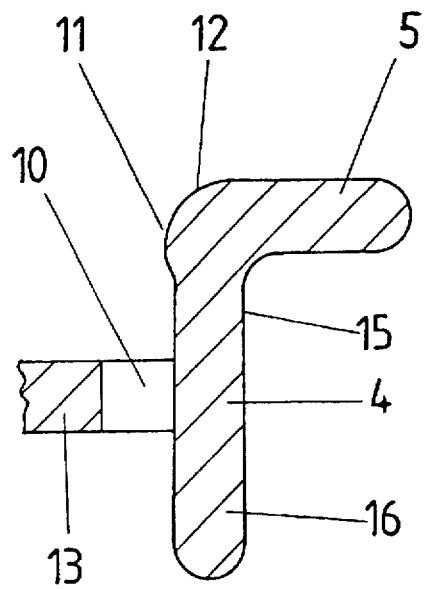

FIG. 9 shows an embodiment of the clamping element (3) with positioning projections (11) which have rounded contours. In this embodiment, not only the transition (12) has been provided with rounded contours, but a nearly continuous transition from the transition zone (12) into the region of the rear side of the vertical ridge (4) is provided. Such an embodiment makes it easier to pull the compact discs, which are held in place in the region of the locating device (1), from the tray (2). Alternatively transition (12) may be in the form of a ramp extending at an angle to vertical ridge (4).

Figure 10:
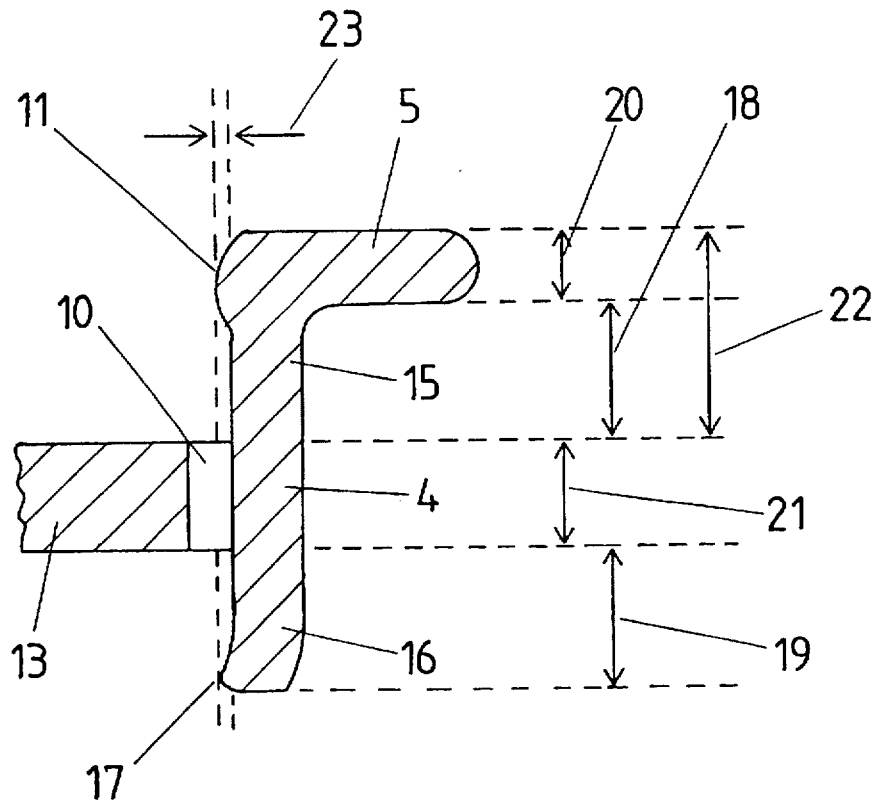

FIG. 10 shows an embodiment of the clamping element (3), where the vertical ridge (4) likewise rises above the support surfaces (6) in order to hold two compact discs in place, and it does so in the region of two segments (15,16) of the holding device. The positioning projection (11), in the area of the radial ridge (5), has a rounded contour. In addition, a further positioning element (17) has been provided in the region of the radial ridge (5), which positioning element faces away from the segment (16) of the holding device. This positioning element (17) can be fabricated in such a manner, that the clamping elements (3) in accordance with FIG. 9 are first injection molded, and then, after their release from the mold, the segments (17) of the holding device are subjected to outward thermoplastic enlargement of the holding device in such a way that they are permanently bent so as to form the positioning elements (17).

The segment lengths (18,19) of the segments (15,16) of the holding device can be selected in such a way that they correspond to one another. The radial ridges (5) have been given a ridge thickness (20) and the plate (13) of the holding device has been given a plate thickness (21). Together, the ridge thickness (20) and the segment length (18) result in an overall height (22). By the interaction of the positioning projections (11) and the positioning elements (17) a positioning profile and a positioning depth (23) are generated.

Figure 11:
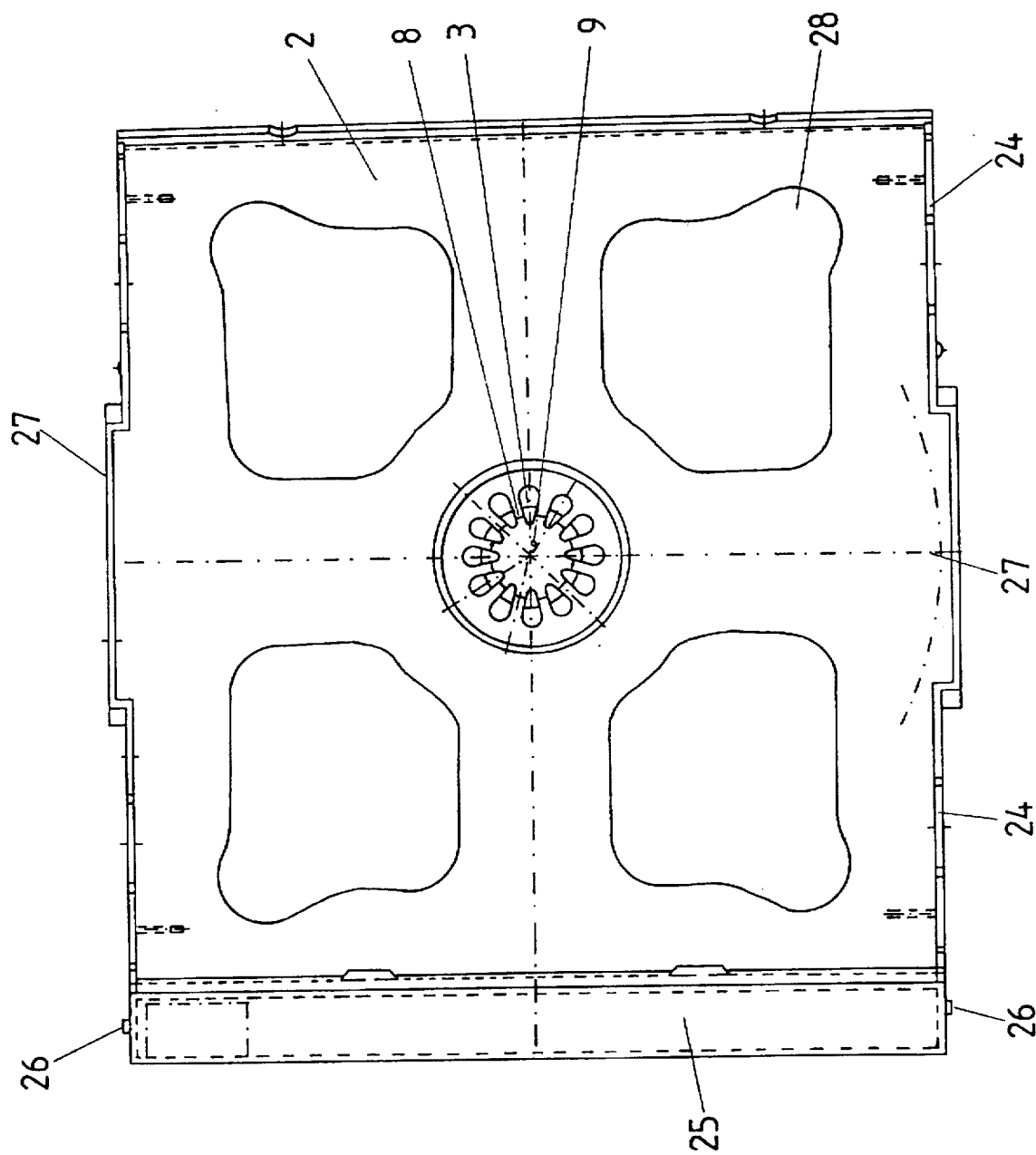

FIG. 11 shows a top view of the tray (2), which is provided with the clamping elements (3). The clamping elements (3) are disposed along the circumference (8) of the central opening (9). In order to reinforce it, the tray (2) is enveloped by an edge (24). At its end point, the tray (2) is provided with a connecting bracket (25) in the region of one of its sides. The connecting bracket (25) carries pegs (26), which have the purpose of facilitating a pivotable arrangement of the tray (2). At its side, the tray (2) can be provided with projections (27), but with an appropriate adaptation of its dimensions to the diameter of a compact disc which is to be held in place, other embodiments are also conceivable. A reduction of the weight can be achieved by means of openings (28) in the tray.

Figure 12:
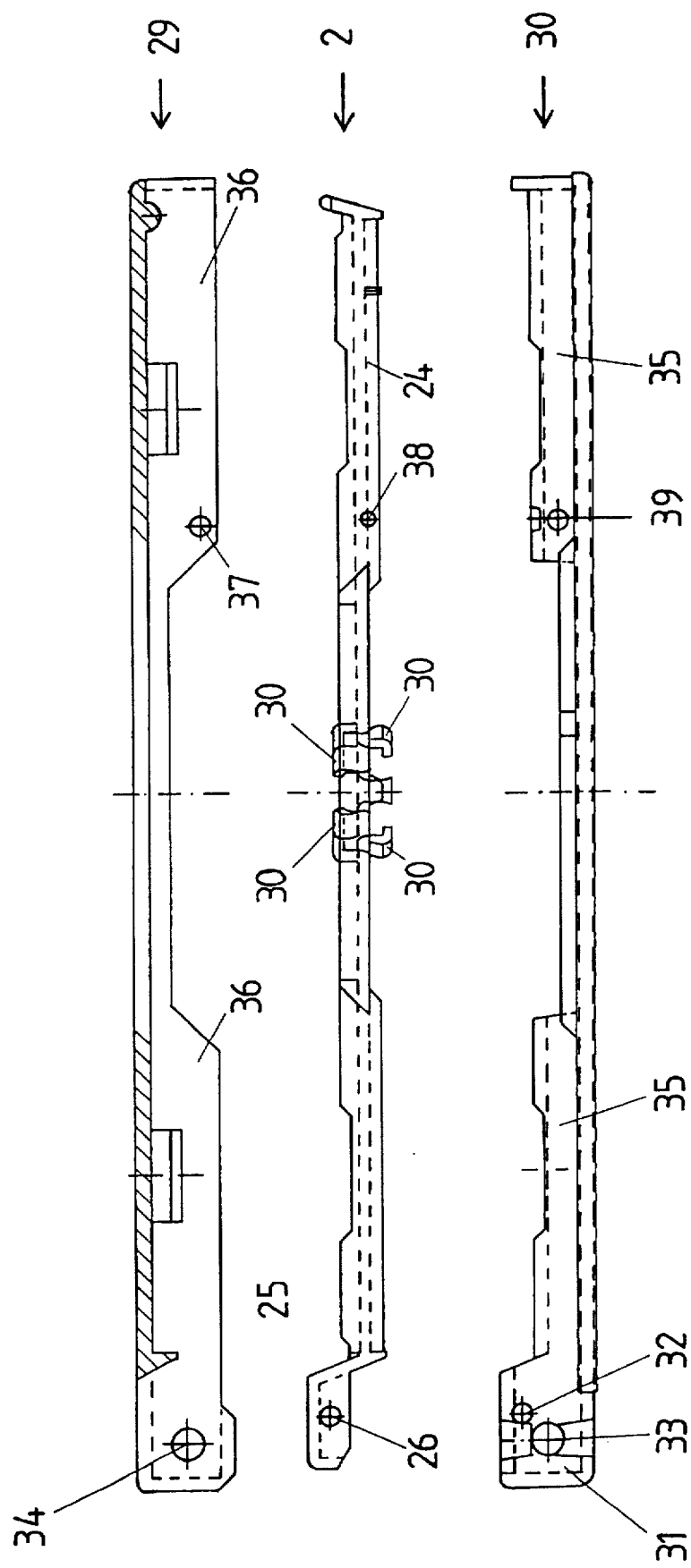

FIG. 12 shows the relationship of the tray (2) to an upper bowl (29) and a lower bowl (30), which jointly form a housing for the tray (2). The lower bowl (30) has openings (32) in the area of the edge bracket (31) for receiving the pegs (26). Beyond this, there are openings (33) for receiving the main pegs (34), which are disposed in the region of the upper shell (29) and have the function of connecting the upper shell (29) with the lower shell (30). The lower shell (30) has a rim (35) and the upper shell (29) is equipped with a rim (36).

In order to make it possible to hold tray (2), upper shell (29) and lower shell (30) in place with respect to each other, positioning elements (37,38,39) are being provided. The positioning elements (37,38,39) can be constructed as portions of increased thickness and as depressions in the regions of the edges (24,35,36), which fit into each other.

Figure 13:
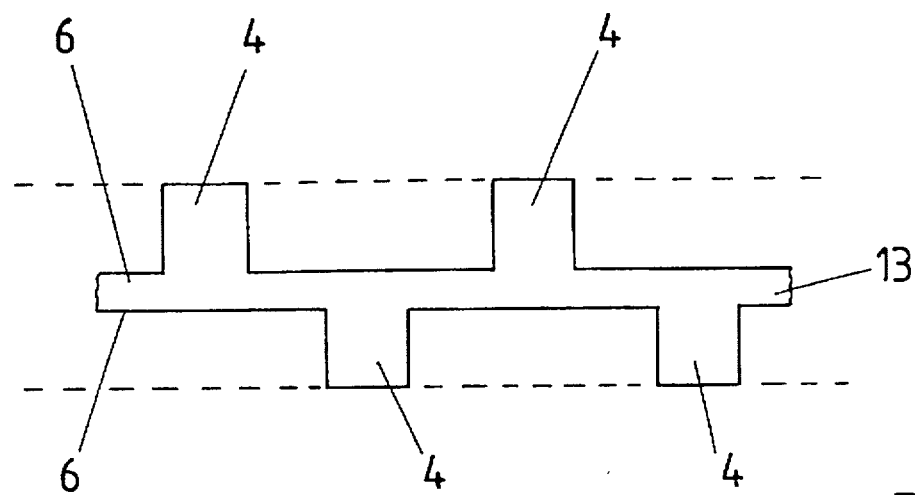

FIG. 13 shows a variation for forming the clamping elements (3) in a design of the tray (2) for holding both sides of the compact discs in place. The arrangement of the clamping elements (3) is shown schematically along the circumference (8) of the central opening (9). In accordance with FIG. 13, the vertical ridges (4), which are formed without radial ridges (5), extend alternately in directions pointing away from each other. The vertical ridges (4) have a sufficient height for holding the compact discs in position.

Figure 14:
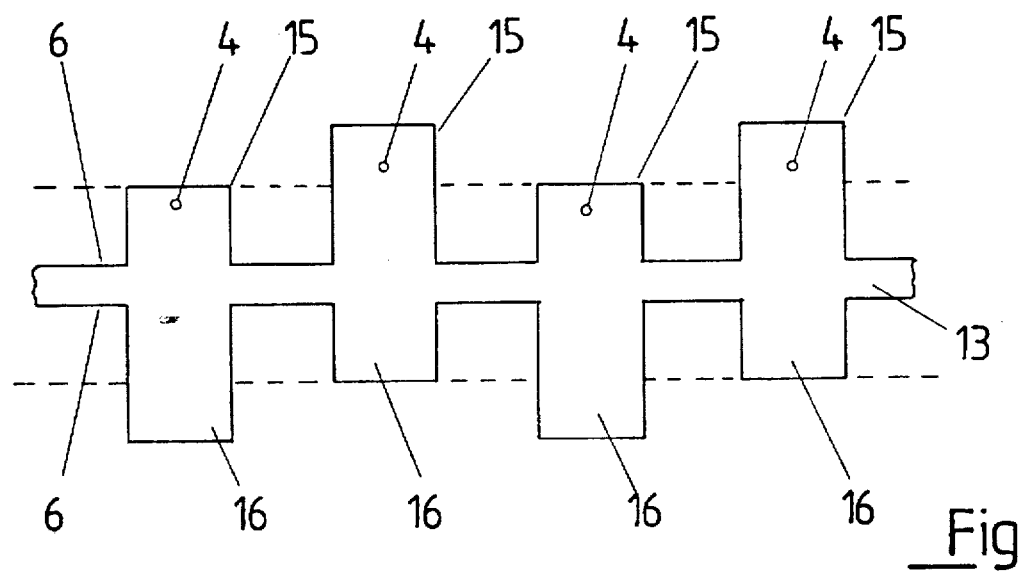

In accordance with the embodiment of FIG. 14, vertical ridges (4) with segments (15,16) of the holding device, which always originate at the same location from the plate (13) of the holding device, extend in opposite directions from each other. However, the segments (15) of the holding device are formed with alternately different lengths.

Figure 15:
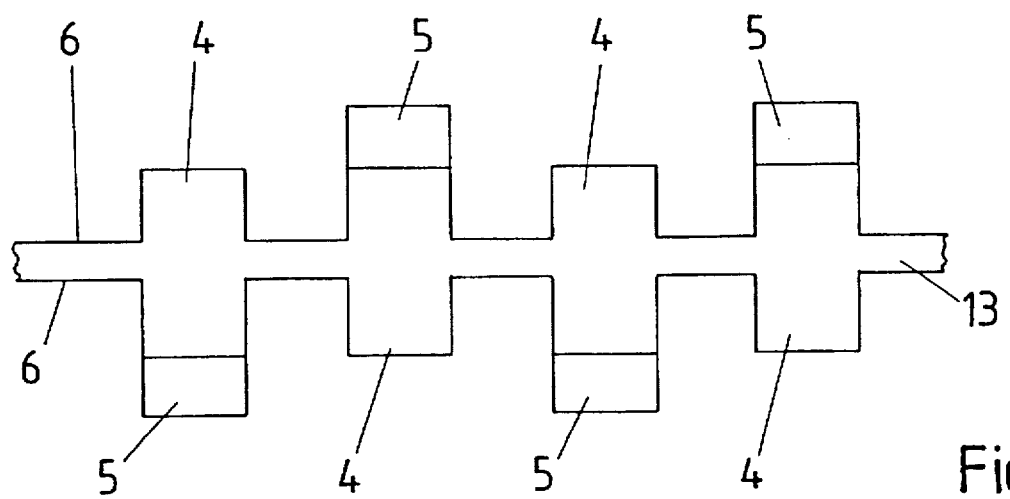

The embodiment in accordance with FIG. 15 is similar to the embodiment according to FIG. 14. However, in the region of each of the longer segments (15,16) of the holding device additional radial ridges (5) are provided.

Figure 16:
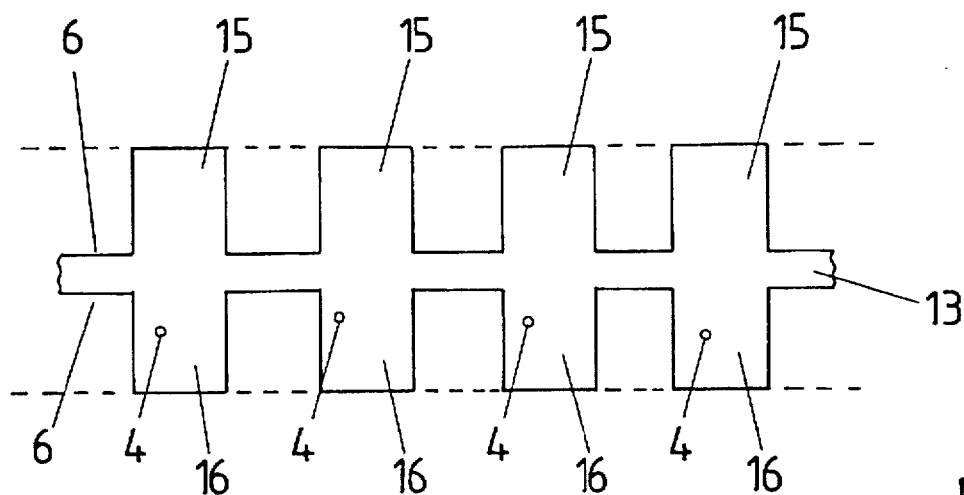

FIG. 16 shows an embodiment similar to that of FIG. 14, but here the segments (15,16) of the holding device are provided with essentially equal lengths.

Figure 17:
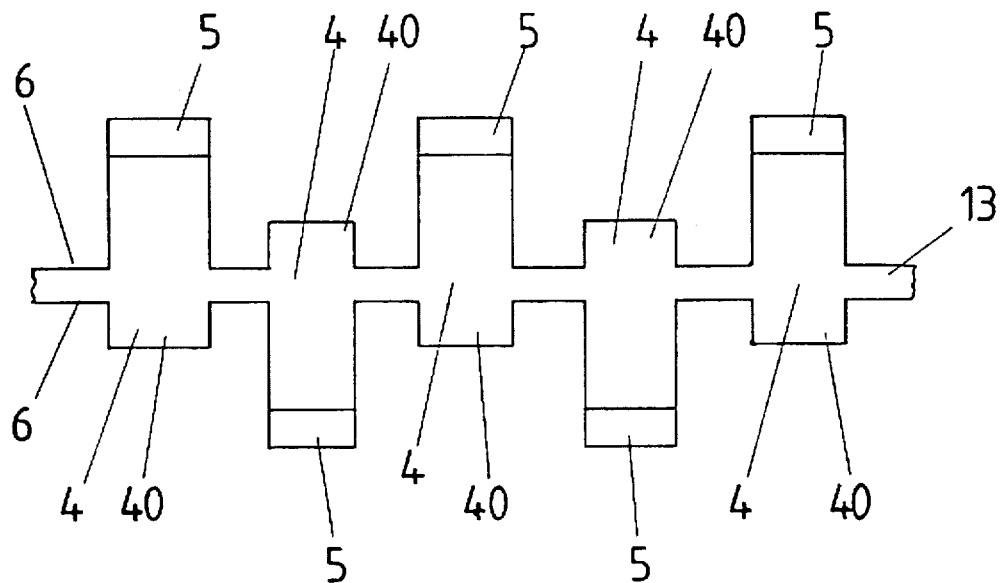

FIG. 17 shows a variation of the embodiment according to FIG. 15. However, in the region of the radial ridges (5) which are facing away from the ends of the vertical ridges (4), in this case, merely truncated segments (40) are provided, which, at most, exert low clamping forces upon the compact discs which are to be held in place, and which segments mainly serve to assist in the centering of the compact disc.

In a design according to the publication U.S. 5,244,085, in which the vertical ridges display a slight incline and where an outer reinforcing ring is connected to an inner support ring for the clamping elements by way of the ridges of the holding device, automatic packaging of compact discs in particular results in high reject rates, because the star-shaped configuration causes a recoil and has a tendency toward causing break-outs. Especially the relatively long ridges of the holding devices have a tendency to break in the region of their transitions to the outer as well as to the inner ring. Furthermore, the inclined disposition of the vertical segments over the entire region over which it extends also results in relatively high forces when the compact disc is deposited, so that the vulnerability to breakage is even further increased.

According to the invention, however, it is contemplated to actually provide an essentially vertical arrangement instead of the slightly inclined vertical ridges (4), and to merely dispose additional positioning projections (11) in such a way, that they form a partial collar around the openings (10). By this means, a precisely defined force is being generated just for the short period of time when the compact disc in pushed in place. Because the moment in time when this force is generated is exactly defined by the positioning of the compact disc relative to the clamping elements (3), a support system for absorbing the forces can be devised in a simple way.

However, in addition to this improvement in the way in which the forces are introduced, the openings (10) are also arranged in such a way, that the long ridges of the holding device contemplated in the publication U.S. 5,244,085 are eliminated. According to the invention, it was recognized that, for example, on the basis of FIG. 18 of the publication U.S. 5,244,085, it was merely necessary to allow the ridge s of the holding device to be extended into the region of the vertical ridges (4) of the clamping elements (3), and at this point to institute directly a transition into the vertical ridges (4). The lever arms of force, which are present at this point will, be significantly shortened by this approach, so that an improved ability to resist these forces is provided.

In particular, it is also not really necessary to generate the thick portions of the outer ring as well as of the ridges of the holding device, which are contemplated according to the publication U.S. 5,244,085. Especially from FIG. 19 of the publication U.S. 5,244,085 it can be seen, that the rings of the holding device and the ridges of the holding device have nearly three times the thickness as the plate of the holding device. According to the present invention, on the other hand, it is sufficient in the case of use with typical automatic loading machines to merely form the regions of the plate (13) of the holding device, which limit the openings (10) similarly to the way in which ridges do this and which hold the clamping elements (3) in position, with about the same thickness as the plate (13) of the holding device.

Beyond this, the possibility of using ridges of the holding devices of reduced dimensions as well as the avoidance of additional parts in the central region of the central opening leads to material savings, which, in view of the very high production volume of the CD packages, result in considerable cost advantages.

The design characteristics of the transition of the plate (13) of the holding device along the openings (10) into the clamping elements (3) will be once more clarified below by referring to FIG. 1 and FIG. 2. From FIG. 1 it can be seen that an external region of the plate (13) of the holding device, which is adjacent to the openings (10), is blended into the clamping elements (3) by ridges (41) of the holding device. The openings (10) in the direction toward the plate (13) of the holding device are preferably provided with rounded boundaries in the region of the corners, so that a continuous transition into the ridges (41) of the holding device can be effected. The ridges (41) of the holding device extend in the direction toward the vertical ridges (4) in such a way that the width, as measured in the direction of the circumference of the central opening (9), is being reduced, however, it is also possible to produce an approximately constant width.

Originating from the plate (13) of the holding device in the direction of the central opening (9), the ridges (41) of the holding device extend into the region of an interior surface of the vertical ridges (4) which faces the central opening (9). In the region below the positioning projections (11), the ridges (41) of the holding device are at a distance from each other, which corresponds at least to the dimension of the positioning projections (11) in the direction of the circumference of the central opening (9).

Figure 2:
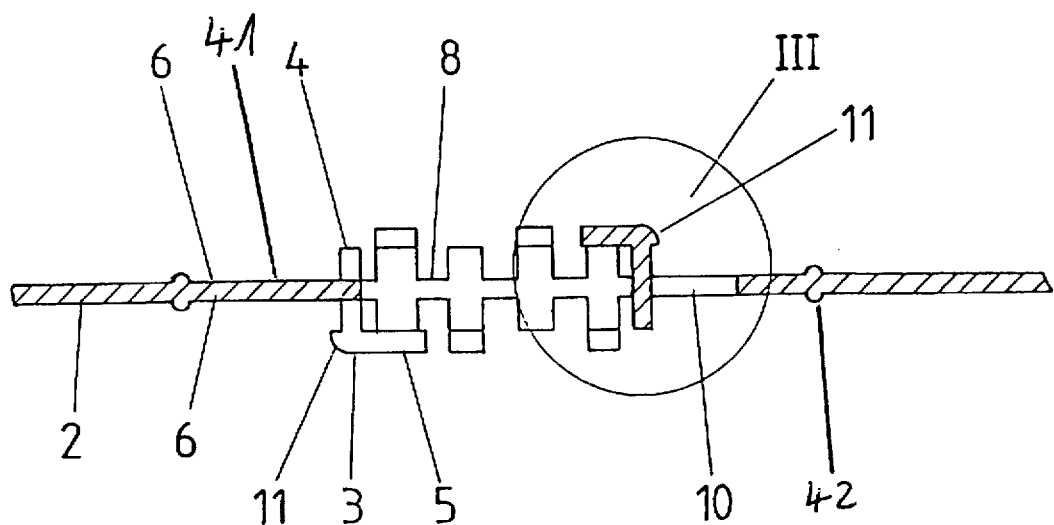

According to FIG. 2, it is especially being contemplated, to give the region of the ridge (41) of the holding device, which extends adjacent to the vertical ridges (4), a rounded transition into the vertical ridges (4) in order to achieve a favorable distribution of forces.

In order to increase the strength, a circumferential reinforcement ring (42) can be provided in accordance to FIG. 2. The openings (10) proceed preferably in such a way that they taper from the plate (13) of the holding device in the direction of the central opening (7). In particular, it has also been contemplated, as seen in a top view according to FIG. 1, to provide a continuation of the contours of the lateral boundaries of the openings (10) into the lateral boundaries of the radial ridges (5), however, in planes that are displaced relative to each other.

I claim:

1. A holding device for compact discs within a receiving container, which contains at least one upper shell and at least one lower shell and which is equipped with clamping elements for retaining the compact discs in the area of a central opening and where the clamping elements with their vertical ridges rise in an essentially perpendicular direction from a support surface of a plate of the holding element for the compact discs and are disposed along the circumference of a central opening of the receiving surface and where, proceeding in a radial direction from a center of the holding device, an opening is disposed behind at least one of the clamping elements, which opening extends in a circumferential direction along at least a part of a rearward boundary of the clamping element, characterized in that the clamping element includes at least one positioning projection (11), which forms a collar over the opening (10) at least in some regions, that the plate (13) of the holding device extends radially inward between adjacent vertical ridges (4), and that by the disposition of the plate (13) of the holding device between said vertical ridges (4) a transition of circumferentially opposite edges of said vertical ridges (4) into the plate of the holding device is formed and radial ridges extending radially inwardly into said center opening from the ends of selected ones of said vertical ridges.

2. Holding device according to claim 1, characterized in that the positioning projection is given a transition into a vertical ridge (4) of the clamping element (3) in the form of a shoulder.

3. Holding device according to claim 1, characterized in that the positioning projection (11) is given a transition into a vertical ridge (4) of the clamping element (3) which is rounded.

4. Holding device according to claim 1, characterized in that the positioning projection (11) includes a transition from a ramp into a vertical ridge (4) of the clamping element (3) and that the ramp contains a boundary surface, which extends essentially at an angle to the vertical ridge (4).

5. Holding device according to claim 1, characterized in that at least one of the clamping elements (4) includes a radial ridge (5), which extends from its origin at the vertical ridge (4) in the direction of the center (7) of the holding device.

6. Holding device according to claim 1, characterized in that along the circumference (8) of the central opening (9), the radial ridges (5) are disposed alternately in the region of the ends of the vertical ridge (4) which face away from each other.

7. Holding device according to claim 1, characterized in that the vertical ridges (4) which originate from a plate (13) of the holding device rise at one side above the support surfaces (6) of the plate (13) of the holding device.

8. Holding device according to claim 1, characterized in that the vertical ridges (4) rise in direction pointing away from each other above both of the support surfaces (6) which form the boundaries of the plate (13) of the holding device.

9. Holding device according to claim 1, characterized in that the opening (10) extends in a circumferential direction across the entire width of the clamping element (3).

10. Holding device according to claim 1, characterized in that the opening (10) and the positioning projection (11) extend in a circumferential direction across a partial region of the clamping element (3) and that they are essentially disposed symmetrically with regard to a center line (14) of the clamping element (3).

11. Holding device according to claim 1, characterized in that for at least one clamping element (3) at least two openings (10) are provided, which are separated from each other by a connecting ridge.

12. Holding device according to claim 1, characterized in that the openings (10) are disposed non-symmetrically with respect to the center line (14).

13. Holding device according to claim 1, characterized in that the opening (10) tapers in a direction pointing away from the clamping element (3).

14. Holding device according to claim 4, characterized in that at least one of the clamping elements (4) includes a radial ridge (5), which extends from its origin at the vertical ridge (4) in the direction of the center (7) of the holding device.

15. Holding device according to claim 14, characterized in that along the circumference (8) of the central opening (9), the radial ridges (5) are disposed alternately in the region of the ends of the vertical ridge (4) which face away from each other.

16. Holding device according to claim 15, characterized in that the vertical ridges (4) which originate from a plate (13) of the holding device rise at one side above the support surfaces (6) of the plate (13) of the holding device.

17. Holding device according to claim 16, characterized in that the vertical ridges (4) rise in direction pointing away from each other above both of the support surfaces (6) which form the boundaries of the plate (13) of the holding device.

18. Holding device according to claim 17, characterized in that the opening (10) and the positioning projection (11) extend in a circumferential direction across a partial region of the clamping element (3) and that they are essentially disposed symmetrically with regard to a center line (14) of the clamping element (3).

19. Holding device according to claim 18, characterized in that for at least one clamping element (3) at least two openings (10) are provided, which are separated from each other by a connecting ridge.

20. Holding device according to claim 19, characterized in that the openings (10) are disposed non-symmetrically with respect to the center line (14).

* * * * *